Aug. 8, 1972 — F. R. BEYER — 3,682,774
CORE CLAMPING SYSTEM FOR A NUCLEAR REACTOR
Filed Sept. 26, 1969

INVENTOR.
FRANK R. BEYER 3,682,774
CORE CLAMPING SYSTEM FOR A
NUCLEAR REACTOR
Frank R. Beyer, Woodland Hills, Calif., assignor to
North American Rockwell Corporation
Filed Sept. 26, 1969, Ser. No. 861,302
Int. Cl. G21c 9/00
U.S. Cl. 176—87                                        6 Claims

ABSTRACT OF THE DISCLOSURE

A core clamping system for a nuclear reactor that utilizes a cylinder connected to a core support structure of the reactor and which is slotted axially to develop a plurality of cantilever beam-spring segments that act upon the core elements at a determined clamping plane to accommodate for expansion and contraction of the reactor core and thereby induce a negative contribution to the power coefficient of the nuclear reactor.

BACKGROUND OF THE INVENTION

The heart of a nuclear reactor power plant is a nuclear reactor which masses together sufficient fissionable material under appropriate conditions to generate neutrons at an equal or greater rate than they are being lost by absorption or leakage so that a self-sustained chain reaction of neutron induced fission occurs,[1] and which is classifiable as fast, intermediate, or slow depending upon whether it operates primarily on fast, intermediate, or slow neutrons.[2] Nuclear reactor power plants use the heat of nuclear fission to generate steam which drives a turbine-generator set and produces electrical power.

The basic parts of a nuclear reactor power plant are (1) a reactor vessel, that contains inter alia fissionable material or fuel, such as uranium or plutonium, which can be in various fuel element forms positioned in a reactor core, and a control system that regulates the number of free neutrons to control the rate of fission, (2) a coolant system that transfers the heat from the fission reaction in the fuel to a steam generator, (3) a steam driven turbine-generator set that uses the steam and produces electrical power, and (4) a containment system for the reactor that includes radiation shielding and radioactive containment to contain any radioactive material that the plant may generate.

The operation of a nuclear reactor is dependent upon the physical size of the reactor core with respect to the mass density of the fissionable material comprising the active core. The reactivity of the core will vary if the shape and thus the volume of the core is altered. If a reactor core of given mass and volume is subjected to operating conditions which tend to alter the volume containing the given mass, the reactivity will necessarily increase or decrease.

Fuel element bowing, irradiation swelling of cladding, and fuel swelling are conditions that tend to alter the volume containing the given mass and can produce positive reactivity effects.

When a fuel element is subjected to conditions where one of its longitudinal sides is at a greater temperature than its opposite side, the fuel element will become distorted and tend to bow convexly in the direction of the greatest temperature. Since the highest temperatures occur in the most central region of the core, all of the fuel elements tend to bow in toward the central axis of the core and thereby reduce the volume of the core which increases reactivity.[3]

[1] U.S. Pat. No. 3,093,563; U.S. Pat. No. 2,708,656.
[2] U.S. Pat. No. 2,992,982.
[3] U.S. Pat. No. 2,961,393.

Irradiation in a fast neutron environment of a fuel element housing or cladding, where the cladding material is an austenitic stainless steel, can also cause the stainless steel to undergo a decrease in density that results in swelling. While in fast breeder reactors, which produce fissionable material while simultaneously generating heat, the fuel element lifetime is dependent upon cladding strength and is therefore limited by the amount of strain that the new fuel, as it swells, imposes on the fuel element cladding.

It is therefore necessary to provide a means for maintaining a "tight" reactor core during operation of the nuclear reactor to assure a negative power coefficient.

OBJECTS OF THE INVENTION

Accordingly, it is an object of the invention to provide a new and improved reactor core restraint.

It is an object of the invention to provide a nuclear reactor core radial restraint.

It is an object of the invention to provide a nuclear reactor core radial restraint to prevent an unacceptable positive contribution to the power coefficient of the nuclear reactor resulting from any fuel element displacement.

It is an object of the invention to provide a nuclear reactor core radial restraint to prevent a positive power coefficient of the nuclear reactor under thermal gradient and metal swelling distortions.

It is an object of the invention to provide a nuclear reactor core radial restraint that is passive and takes advantage of differences in thermal expansion to achieve a tight reactor core under all operating conditions of the nuclear reactor.

SUMMARY OF THE INVENTION

Briefly, in accordance with the invention, a core clamping system for a nuclear reactor is provided at a clamping plane located above the nuclear reactor core mid-plane to prevent a positive contribution to the power coefficient as a result of element bowing under thermal gradients, irradiation swelling of cladding, fuel swelling, and the like. The core clamping structure as described is a cylinder connected below the core midplane to a core support structure through a flange portion. The barrel portion of the cylinder is slotted axially from the top, i.e., from above the core midplane, into cantilever beam-spring segments that bear against the outer elements of the reactor core at the clamping plane and maintain a "tight" core under substantially all nuclear reactor operating conditions. Expansion or contraction of the reactor core is accommodated by the spring action of the core clamping system.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawing.

DESCRIPTION OF THE INVENTION

Figures 1, 2, 3, 4:
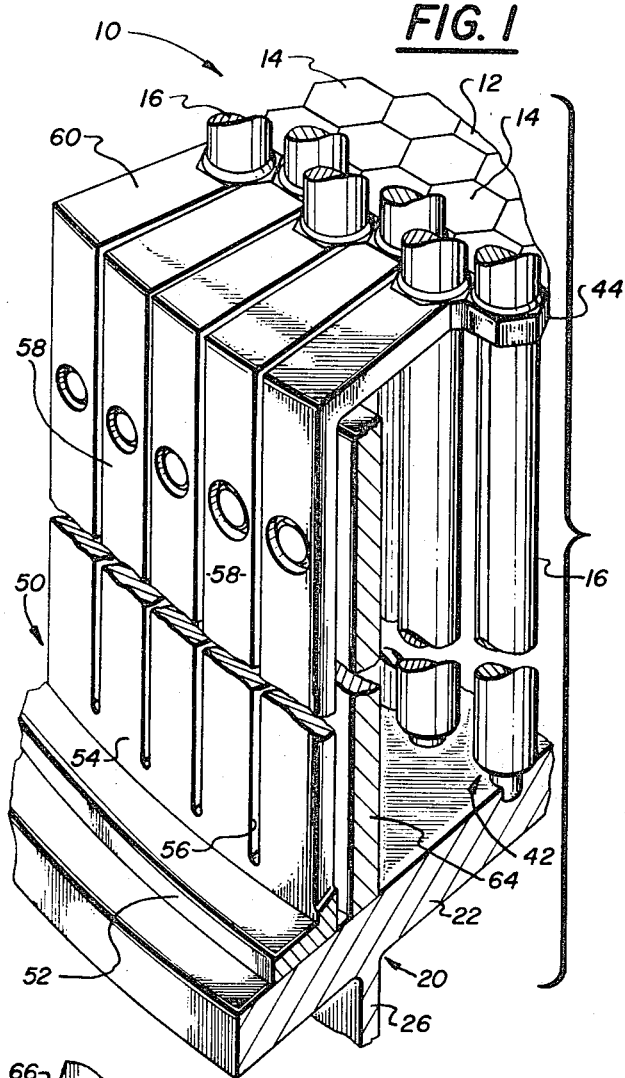
FIG. 1 is a perspective view, partly sectional and partly broken away, of a nuclear reactor core including the described reactor core restraint of the invention.
FIG. 2 is an elevation, partly sectional and partly broken away of the nuclear reactor core and reactor core restraint of FIG. 1.
FIG. 3 is a sectional plan view, partly broken away, of the nuclear reactor core and reactor core restraint of FIGS. 1 and 2, particularly along the line 3—3 of FIG. 2.
FIG. 4 is an enlarged perspective view, partly broken away, of an element of the nuclear reactor core of FIG. 1.

Referring to the drawing, a nuclear reactor core 10 includes a plurality of similar fuel elements 12 that contain a suitable nuclear fuel. The fuel elements 12 are arranged to define the central region of the reactor core and are surrounded by a plurality of similar blanket elements 14 that are arranged about the periphery of the bundled fuel elements. A row of reflector elements 16 abuts the outer row of blanket elements. The blanket elements 14 can be identical in external configuration to the fuel elements 12. The reflector elements can be stainless steel bars of similar external configuration.

The reactor core 10 is the primary heat source for a nuclear power plant. Where the reactor core operates in a fast neutron flux, the nuclear fuel in the several fuel elements 12 can be mixed plutonium and uranium oxide suitably contained and subdivided to permit adequate heat removal by a circulating coolant such as liquid sodium. The blanket elements 14 can contain uranium oxide to improve neutron utilization and to assist in flattening the power distribution of the reactor and thereby improve fuel utilization.

The entire array of elements—fuel elements 12, blanket elements 14, reflector elements 16 which form the nuclear reactor core 10—is supported on a core support structure 20.

The core support structure 20 has an upper grid plate 22 and a lower grid plate 24. The core support structure is connected to a reactor vessel (not shown) that encloses the nuclear reactor core 10; the core support structure thus provides a substantially fixed support for the entire array of elements. Upper grid plate 22 is spaced from the lower grid plate 24 by cylindrical shell portion 26 which can be integrally formed with the upper grid plate 22 and the lower grid plate 24 as illustrated. The spaced upper and lower grid plates 22 and 24 develop a plenum chamber 28 for the circulating coolant.

Each of the fuel elements 12 and blanket elements 14 has a tubular end portion 30 that is positioned through a pair of aligned apertures in the upper and lower grid plates 22 and 24, such as aligned apertures 32 and 34 respectively. The coolant fluid in the plenum chamber 28 flows into each fuel element 12 and blanket element 14 through similar orifices 36 in the tubular end portion 30 of each element. The aligned apertures, such as apertures 32 and 34, in the upper and lower grid plates 22 and 24 are suitably spaced apart from similar pairs of aligned apertures so that a gap, such as gap 38, exists between adjacent elements. Gap 38 provides for ease of assembly of the elements into the desired core array and for the removal of the elements therefrom, and to accommodate for any manufacturing tolerances in the dimensions of the elements. Hard-faced, spacer pads 40 at each corner (see detail in FIG. 4) of the element housings, i.e., fuel elements 12 and blanket elements 14, provide inter-element bearing points and ensure that gap 38 has a minimum dimension for core assembly clearance.

The reflector elements 16 are gimbal-mounted on the upper grid plate 22 by a quasi ball-and-socket support 42 that does not penetrate into the plenum chamber 28. A flange 44 on each reflector element is adapted to bear upon the adjacent spacer pads 40 of the blanket elements 14 in a "clamping plane" as defined by the abutting flange and spacer pads.

The core clamp 50 of the invention cooperates with the components of the reactor core 10 as described hereinbefore. In the illustrated reactor core, a generally cylindrical core clamp 50 is connected to the core support structure, and particularly to the outwardly extending upper grid plate 22 as shown by FIG. 2. A flange portion 52 of the core clamp 50 is connected by welding, bolts, or the like to the upper grid plate 22. A barrel portion 54 of the core clamp 50 is suitably formed with a plurality of peripherally spaced slots 56 developing spaced-apart resilient segments 58. Each resilient segment 58 preferably has a pressure shoe portion 60 that bears against its respective reflector element flange 44. Each pressure shoe portion can be suitably formed to the peripheral contour of its respective reflector element flange as illustrated. The segmented barrel portion 54 thereby has a plurality of cantilevered beam-spring segments acting upon the elements in the reactor core and developing a centripetal clamping force at the clamping plane.

The elevation of the clamping plane—as generally defined by the pressure shoe portion 60 of each core clamp segment 58, the flange 44 of each reflector element 16, and the spacer pads 40 of each of the fuel and blanket elements 12 and 14—relative to the core support structure 20 is selected to assure negative reactivity changes in the reactor core which can result from thermal bowing, irradiation swelling of cladding material, and fuel swelling as described hereinbefore. This clamping plane is normally located above a central plane in the active reactor core to ensure the desired negative contribution to the power coefficient.

A thermal shield consists at least of an inner shield member 64 spaced from an outer shield member 66; both preferably positioned at least around the active portion of the reactor core 10 with the core clamp 50 positioned generally therebetween. The outer shield member 66 provides a limit for radial or outward expansion of the resilient segments resulting from changes in the dimension of the reactor core during reactor operation. This thermal shielding protects the reactor vessel (not shown) and the core clamp 50 from neutron damage, and further reduces internal heat generation in external biological shielding (not shown but conventional).

Since the reflector elements 16 are gimbal-mounted, a suitable link member 70 can be used to retain the reflector elements 16 when the fuel and blanket elements 12 and 14 are individually or severally removed from the reactor core 10. For example, a link memebr 70 as illustrated by FIG. 2 has a suitable shoulder cap screw 72 positioned through a clear hole 74 in core clamp segment 58 and an aligned clear hole 76 in the inner shield member 64, and threaded into a tapped hole 78 in the reflector element 16.

With the core clamping system as described, a passive core clamp is provided that takes advantage of differences in thermal expansion of the reactor core components and of the cantilever spring action of the core clamp segments 58 so that a "tight" reactor core is maintained under substantially all nuclear reactor operating conditions. The development of a temperature differential across the core, e.g., axially across the region defined by the various elements, produces a differential radial expansion between the core support structure, i.e., grid plates 22 and 24, and the clamping plane. This appears as interference between the reactor core and the core clamping system of the invention. This interference can be distributed between manufacturing tolerance clearances and the selected clamping force developed by the core clamp segments 58. The selected clamping force can be varied by changing the cross-section and/or physical length of the cantilevered segments 58; for example, by altering the length of the slots 56 or by changing the elevtion of the clamping plane.

It is contemplated that radial clamping action can be generated during isothermal rise in temperature by making the structure, including grid plates and core clamp, from a material of lower coefficient of thermal expansion than that of the core element housings; e.g., Inconel or Hastelloy. This permits a greater degree of looseness between core components than when the same structural material is used throughout, and a larger clamping force can be attained when a full temperature rise has been developed across the reactor core.

As will be evidenced from the foregoing description, other modifications and applications will occur to those

I claim:

1. A core clamping system for a nuclear reactor core, the core clamping system comprising:
    (a) a core support member positioned immediately below said nuclear reactor core,
    (b) a plurality of elongated elements in the reactor core supported by said core support member, each of said elongated elements being positioned generally parallel with the reactor core longitudinal axis,
    (c) spacer means positioned on selected ones of said elongated elements maintaining said elements in a predetermined spaced relationship, and
    (d) a cylindrical core clamp having a circumferential base portion extending above and fixed with respect to said core support member and a circumferential series of parallel, spaced, resilient segments integral with and extending upwardly as cantilevered beams from said base portion to a clamping plane containing said spacer means, each of said segments being separated by axially extending slots and terminating in an integral, radially inwardly extending pressure shoe portion having a tip abutting said spaced means to develop an inward clamping force at said clamping plane.

2. The core clamping system of claim 1 in which said core support member has a plurality of spaced apertures and further comprising:
    (a) respective ones of the plurality of elongated elements being fuel elements removably positioned in associated ones of said apertures in said core support member to support said elongated fuel elements in a loosely-packed fuel element array;
    (b) a plurality of elongated reflector elements generally encircling said fuel element array and removably positioned on said support member, said reflector elements and said fuel elements generally defining a core assembly in the reactor core;
    (c) said spacer means comprising spacer pads positioned on selected ones of said elongated fuel elements to maintain said elements in a predetermined minimum spaced relationship;
    (d) means on each of said reflector elements forming a flange generally in the same horizontal plane as said spacer pads and abutting adjacent one of said pads; and
    (e) pressure shoe portions extending from each of said spaced resilient segments generally perpendicular to said reflector elements to a position abutting said flanges on said reflector elements.

3. The core clamping system of claim 2 in which said core clamp includes a retaining means linking said core clamp and said elongated reflector elements.

4. The core clamping system of claim 2 in which said spacer means are spacer pads positioned on selected adjacent and abutting surfaces of said elongated elements generally at said clamping plane.

5. The core clamping system of claim 1 in which said core support member has a shield means spaced from and generally enclosing said core clamp, said shield means defining a maximum outwardly extending limit for said core clamp.

6. The core clamping system of claim 1 in which said core support member and said core clamp are formed from a material having a first coefficient of thermal expansion and said elongated elements have a second coefficient of expansion.

References Cited

UNITED STATES PATENTS

| | | | |
|---|---|---|---|
| 2,998,370 | 8/1961 | Gaunt et al. | 176—85 |
| 3,100,188 | 8/1963 | Fraus et al. | 176—85 |
| 3,124,514 | 3/1964 | Koutz et al. | 176—40 |
| 3,206,374 | 3/1965 | Lemesle et al. | 176—85 |
| 3,215,608 | 11/1965 | Guenther | 176—85 |
| 3,260,649 | 7/1966 | Jens et al. | 176—40 |
| 3,260,650 | 7/1966 | Kalk et al. | 176—85 |

BENJAMIN R. PADGETT, Primary Examiner

H. E. BEHREND, Assistant Examiner

U.S. Cl. X.R.

176—85